UNITED STATES PATENT OFFICE.

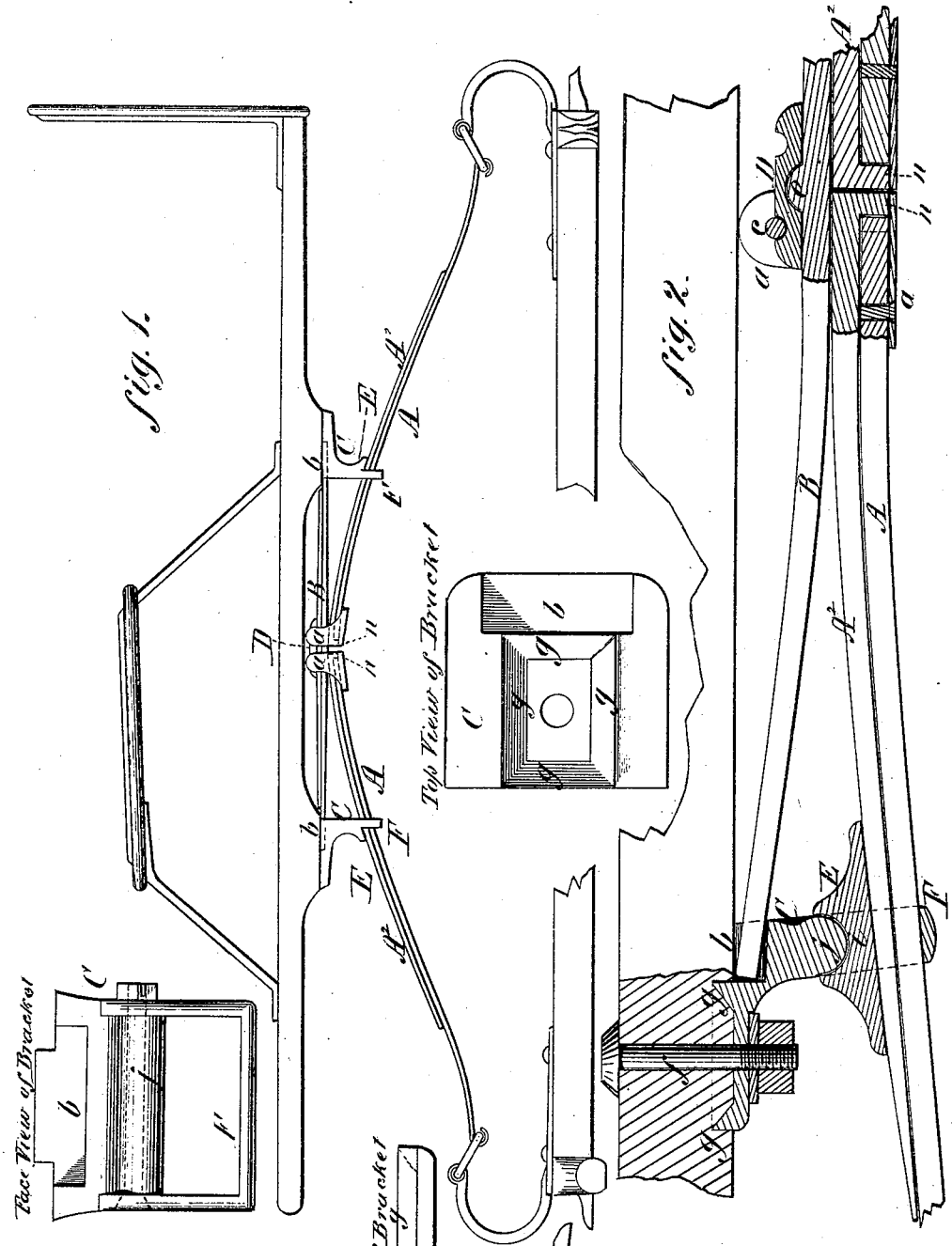

BENJAMIN H. OTIS, OF NORA, ILLINOIS, ASSIGNOR OF TWO-THIRDS HIS RIGHT TO WILLIAM LEACH AND OLIVER O. DAVIS, OF SAME PLACE.

IMPROVEMENT IN VEHICLE-SPRINGS.

Specification forming part of Letters Patent No. 178,798, dated June 13, 1876; application filed May 16, 1876.

*To all whom it may concern:*

Be it known that I, BENJAMIN H. OTIS, of Nora, in the county of Jo Daviess and State of Illinois, have invented certain new and useful Improvements in Carriage-Springs, of which the following is a specification:

My invention relates to springs applicable to vehicles and wagon-seats.

In a patent granted to me March 31, 1874, is described and shown a spring of the kind to which my present improvements are applied, and which are designed to render such spring more effective and durable.

The spring referred to consists, mainly, of a straight center spring, which is united by clips to the inner ends of the mainsprings, with which are combined bearing-brackets, depending from the supported frame or body. With the depending brackets I have combined oscillating or adjustable bearing-caps, the object of which is to give a rocking bearing for the bracket at the points of its connection with the springs, and thus prevent the springs from being worn or cut out at this point. I have also combined, with the spring-uniting clips, a bearing-saddle, whereby the center spring is prevented from being worn and cut out by the clip-bolts, as the saddle bears upon the spring and the clip-bolts upon the saddle.

A recess is made in the under side of the saddle, into which a small stud projects from the center spring, to hold the free ends thereof in the recesses in the bearing-brackets by preventing any end play in the spring.

The leaves of the mainsprings are maintained in position by looped bearing-brackets and the clips, and upsetting the adjacent ends of the spring-leaves, so as to lap over the ends of the mainsprings secured in the clips, and thus hold the spring-leaves securely in place without being riveted at any point.

In the accompanying drawings, Figure 1 represents an elevation of the body-frame of a vehicle embracing my improvements; Fig. 2, a vertical section, showing the connection of the springs with one of the clips and bearing-brackets on an enlarged scale.

The drawings represent the body-frame and part of the running-gear of a light road-wagon with sectional side springs A A, to the ends of which a straight center spring, B, is connected by clips $a$, and upon which center springs the body-frame is supported by abutting the free ends of the center spring into recesses $b$ in the bearing-brackets C, which are secured to the under side of the body-frame. The center spring is a straight plate, and crosses the adjacent ends of the mainsprings, which, in the example shown, is in two sections, each of which are united to separate clips $a$ by rivets or by welding them, while the upper ends of the clips are united by cross-bolts $c$, which confine in place a bearing-saddle, D, between which and the mainspring the center springs pass. The clip or its bolts $c$ fit into grooves in the saddle, and hold it in place, and thus enable it to serve as a bearing for the clip or bolts, and avoid the wearing or cutting out of the top surface of the center spring, besides serving to hold the center spring from endwise movement, and prevent its ends from all liability of slipping out of its recess-bearings $b$ in the brackets by providing a recess in the under side of the saddle, to receive a short stud, $e$, Fig. 2, on the center spring. This is important, as otherwise the end movement of the center spring might displace it from one or the other of its holding-bracket recesses. These brackets are secured to the under side of the body-frame by bolts $f$ a suitable distance on each side of the clips; and, to render their connection more secure, the brackets are provided with bracing-tongues $g$, which enter recesses in the body-frame, and give a firm hold and bracing to the brackets against the action both of the main and center springs.

These brackets form bearings upon each section of the mainsprings; and to prevent the latter from being injured and cut out by such bearing action, I provide the brackets with rocking bearing-caps E, which fit upon the springs, and are held in place by a cross-groove, $i$, in a raised projection of the cap, into which the rounded tongue $j$ of the bracket fits, so that the cap is free to rock in its groove to conform to the action of the spring; and by this arrangement the broad bearing of the cap saves the springs from injury which they would otherwise receive from an unyielding rubbing action of a contacting-point of the bracket. These adjustable bearing-caps are held in place vertically by the bracket-tongues and laterally by yokes F, bolted to the sides of the brackets, and embracing the caps and the main spring or springs. The leaves $A^2$ of the mainsprings are held in place without fastenings by the clips and the brackets embracing their edges, and having their inner ends upset, so as to form shoulders $n$, Fig. 2, which, fitting over the ends of the mainsprings secured in the clips, prevent the leaves from moving down, while their upset ends, abutting against each other between the clips, keep the leaves from any end movement whatever, so that they are as securely fixed, when fitted in place, as if they were riveted together. This advantage of the holding-shoulders, however, can only be obtained when the mainspring is made in sections and secured to separate clips. The mainspring, however, may be intact, and may also be elliptical, if desired, and of any suitable material. The springs may also be used at the ends instead of at the sides of the vehicle. They may also be applied to wagon-seats, if desired.

The special function of the bearing-brackets is to cause the main spring or springs to act with a downward thrust upon the center spring, and thereby give an easy action to the connected springs, for, were it not for this bearing-connection of the body-frame upon the mainspring, the center spring, being straight, would have no action at all auxiliary to the mainspring.

I claim—

1. The combination of the brackets C and the center and main springs A B with adjustable bearing-caps E for the mainsprings, substantially as herein set forth.

2. The adjustable bearing-caps E, provided each with a central cross-groove, $i$, in combination with the rounded tongue $j$ of the bracket, as and for the purpose set forth.

3. The combination, with the springs A B and the adjustable bearing-caps E, of the bracket-yokes F, whereby the caps and the springs are retained in place laterally.

4. The bearing-brackets C, provided with the bracing-tongues $g$, in combination with the bolts $f$, as described.

5. The saddle-bearing D, in combination with the clips $a$ and the center spring B, whereby to relieve the clip or its bolt from direct bearing upon the spring.

6. The clip-saddle bearing D, provided with a bottom recess, in combination with the stud $e$ on the center spring, whereby the latter is locked against end movement, and securely confined in its end bearing-recesses.

7. The leaf-springs provided with shouldered ends $n$, in combination with the mainsprings A, the clips $a$, and the yoke-brackets, whereby the leaf-springs are held in place both laterally and endwise without fastenings.

In testimony whereof I have affixed my signature in the presence of two witnesses.

BENJAMIN H. OTIS.

Witnesses:
  WILLIAM B. LEACH,
  OLIVER O. DAVIS.